V. M. HARRIS.
COMBINED MOTION PICTURE CAMERA AND PROJECTOR.
APPLICATION FILED OCT. 6, 1917.

1,291,865.

Patented Jan. 21, 1919.
4 SHEETS—SHEET 1.

Witnesses:

Inventor
Varian M. Harris
By Williams, Bradbury & Lee
Attorneys

V. M. HARRIS.
COMBINED MOTION PICTURE CAMERA AND PROJECTOR.
APPLICATION FILED OCT. 6, 1917.

1,291,865.

Patented Jan. 21, 1919.
4 SHEETS—SHEET 4.

UNITED STATES PATENT OFFICE.

VARIAN M. HARRIS, OF CHICAGO, ILLINOIS, ASSIGNOR, BY MESNE ASSIGNMENTS, TO KLIX MANUFACTURING COMPANY, OF CHICAGO, ILLINOIS, A CORPORATION OF ILLINOIS.

COMBINED MOTION-PICTURE CAMERA AND PROJECTOR.

1,291,865.  Specification of Letters Patent.  Patented Jan. 21, 1919.

Application filed October 6, 1917. Serial No. 195,040.

*To all whom it may concern:*

Be it known that I, VARIAN M. HARRIS, a citizen of the United States, residing at Chicago, in the county of Cook and State of Illinois, have invented a certain new and useful Improvement in Combined Motion-Picture Cameras and Projectors, of which the following is a full, clear, concise, and exact description, reference being had to the accompanying drawings, forming a part of this specification.

My invention relates to motion picture cameras and projectors, the underlying purpose of my invention being to provide an efficient but inexpensive motion picture camera and projector for use by amateurs and in homes, schools, etc.

In accordance with my present invention this general purpose is accomplished by the provision of a camera which is simple and compact, a projecting attachment which can be combined with the camera in such manner as to use the same mechanism in large part for both picture taking and picture projecting, and by the use, in projecting, of an illuminating element so small that the film will not be ignited even if left in a position of rest. These several general objects, together with the more incidental or secondary objects of my invention, will more clearly appear in connection with the following description of the means whereby these ends are attained. In following this description reference may be had to the accompanying drawings, in which.

The same reference numerals apply to like or corresponding parts in all of these several figures.

Figure 2:
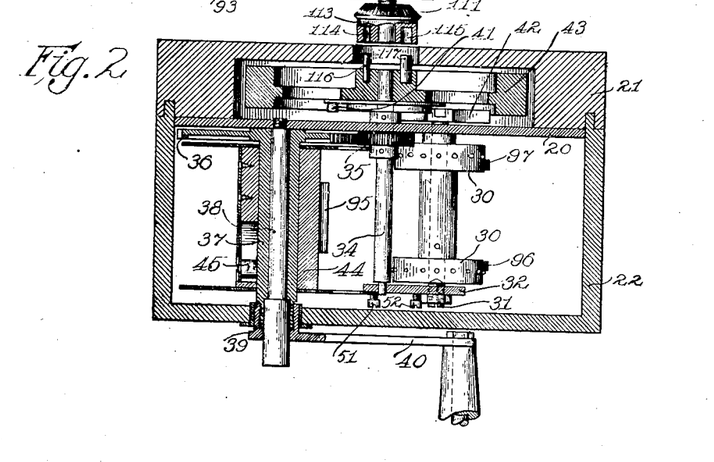
Fig. 2 is a cross sectional view taken on line 2—2 of Fig. 1.
Figures 3, 4, 6, 7, 8:
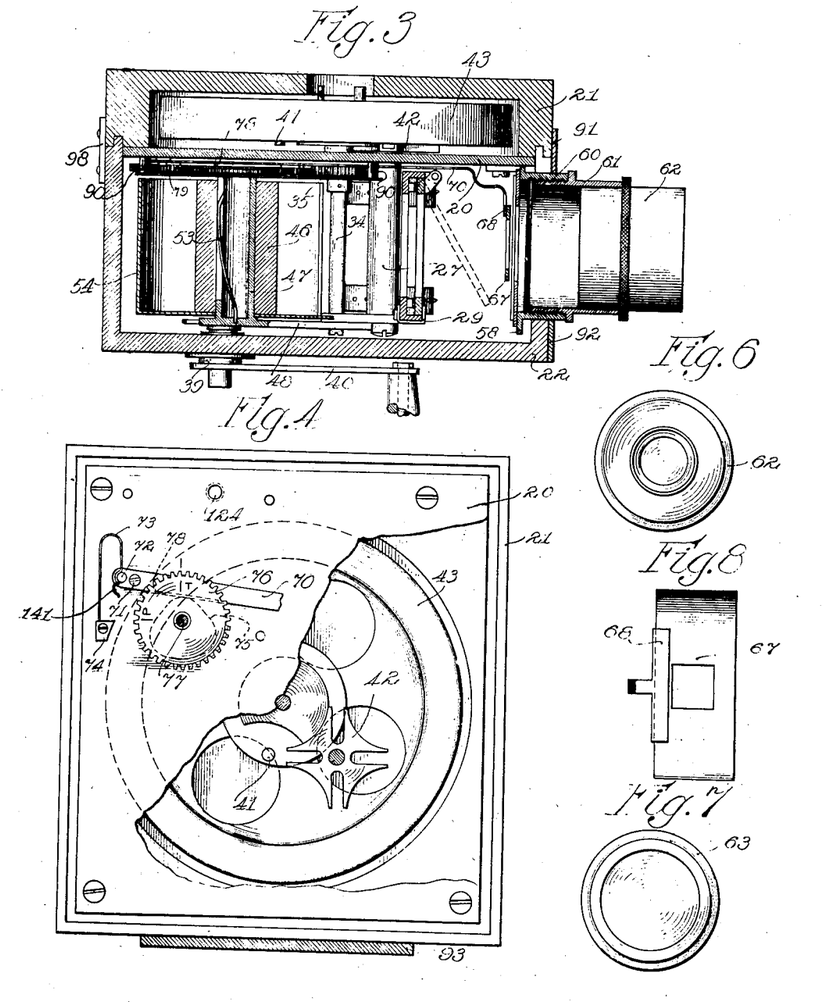
Fig. 3 is a cross sectional view taken on line 3—3 of Fig. 1.
Fig. 4 is a side elevation corresponding with Fig. 1, except that a considerable portion of the mechanism shown in Fig. 1 has been removed, and except also that the base plate is in part broken away to reveal the mechanism otherwise concealed by it.
Fig. 6 is a front elevational view of the taking lens.
Fig. 7 is a corresponding view of the projecting lens.
Fig. 8 is a rear view of the taking shutter, as seen in a cross sectional view taken in the direction of the arrows on lines 8—8 of Fig. 1.

Referring first more particularly to the taking camera, it will be understood that the principal parts of the mechanism are all carried by a metallic frame plate 20, which is securely attached to the wooden base block 21 of the camera box, which comprises also the cover 22, the base block 21 being grooved, as best indicated in Figs. 2 and 3, to receive the tenon formed in the edge of the cover 22.

In a general way the mechanism of the camera provides a film gate through which the unexposed film is intermittently to be passed in picture taking, step by step sprocket mechanism for advancing the film through the film gate, and film spools from one of which the unexposed film is unwound and onto the other of which the exposed film is wound as the motion picture is taken, and lens and shutter mechanism for exposing the film during its periodic intervals of rest to the image thrown upon it by the lens.

The film gate comprises a chute 23 having an aperture 24 (the function of which is to permit the passage of light in projecting, and as subsequently described) and an apertured door 25, which is hinged at 26, 26 to the chute 23, the chute being attached to and supported by a substantial stud or post 27, which projects from the frame plate 20 upon which it is secured.

The light springs 28 attached at one end by rivets to the door 25 serve to guide the film firmly and evenly along the back surface of the chute 23. A hinged catch 29 serves to retain the door in its closed position except when it is to be opened, as indicated in dotted lines in Fig. 3, upon threading the film through the mechanism of the camera.

Immediately below the film gate is rotatably mounted a pair of rigidly connected film sprocket wheels 30, 30. This pair of wheels is supported by a pivot bearing 31 adjustably mounted in a bearing plate 32, which is substantially fastened by the screw 33 to the outer end of the pillar or post 27. This bearing plate 32 provides also an outer bearing for the spindle 34, which has a bearing also in the frame plate 20, and which carries a drive pinion 35 meshing with a drive gear 36, which is attached to, or preferably is formed integrally with, a drive sleeve 37, which rotates upon a fixed pillar 38 mounted in the frame plate, the drive sleeve 37 being shouldered and screw-threaded at its outer end, as indicated, to receive the internally screw-threaded boss 39 of the drive crank 40. On the reverse side of the frame plate 20 the drive spindle 34 carries the male member of a Geneva gear 41, the female member 42 of which is attached to the spindle, indicated only in dotted lines, upon which the sprocket wheels 30, 30, are mounted. The drive spindle 34 carries also at its innermost end a fly wheel 43, the base 21 of the camera box being hollowed out to receive the fly wheel and to permit its rotation.

It will be seen that as the crank 40 is rotated motion will be transmitted through the drive sleeve 37 and its associated drive gear 36 to the drive pinion 35, and thence intermittently by way of the Geneva gearing 41 and 42 to the sprocket wheels 30, 30. The fly wheel acts to steady the motion of these parts.

The film take-up spool 44 slips loosely over the drive sleeve 37, but this take-up spool is provided with a spring-pressed foot 45, which affords sufficient frictional engagement between the drive spindle and the spool to cause the spindle to rotate in such a manner as to take up the film which has passed through the film gate, the frictional drive of the spool, as provided by the spring foot 45, serving to permit sufficient slippage to take up the film at the necessary rate regardless of how much film may be wound upon the body of the spindle, and regardless, therefore, of the diameter upon which the film is being wound at any particular moment.

The unexposed film spool 46 is rotatably mounted upon a hollow supporting stud 47, which in turn is carried by the arm 48, which has a bayonet-like connection with the bearing plate 32, this connection being provided by the slots 49 and 50 formed in the lower extremity of the arm and by the shouldered and headed screws 51 and 52 which take into the bearing plate 32. It will be seen that a diagonally upward movement of the arm 48 will disengage it from the bearing plate 32, whereby the arm and the hollow stud 47, together with the unexposed film spool, may be bodily removed to permit the insertion of a fresh spool of film. The spring 53 pressing through a slot in the stud 47 provides a frictional drag upon the unexposed film spool, the unexposed film being protected from exposure to light by a cup-like metallic cover 54, which is fixedly attached to the stud 47 or the arm 48 upon which it is carried. The unexposed film cover 54 is provided with a peripheral opening on the side toward the front of the camera, to permit the withdrawal of unexposed film as it is conveyed to the film gate.

A loop regulating spring 55 is preferably formed of wire bent substantially at right angles at 56, and is attached at 57 to the arm 48 which supports the film cover 54. It will be noted that the film indicated in the broken line passes over the bend at the free end of this spring, with the result that as the film is drawn intermittently into the film gate the variations in the length of the loop of film between the spool from which the film is fed and the top of the film gate will cause an intermittent up and down movement of the free end of the spring 55, the spring reacting to maintain a substantially uniform rotation of the unexposed film spool regardless of the intermittency with which the film is fed through the film gate.

A lens tube bracket 58 is attached by the screws 59, 59 to the frame plate 20, this bracket carrying a suitable lens tube 60, into which may be screwed the tube 61 of the picture taking lens 62 or the small threaded tube of the projecting lens 63. A pair of slideways 64 and 65 attached to the rearward side of the bracket 58 permits the insertion or withdrawal of a series of stops having varying sized apertures, one such stop plate being shown at 66. One such stop plate is shown in elevation in Fig. 5, where the dotted lines indicate that other stop plates will have apertures of various sizes. Immediately back of the lens supporting bracket and the stop plate carried thereby is located the apertured shutter plate 67, which is adapted to be removably inserted in the spring clip 68, which is mounted at the free end of the shutter oscillating arm 70, this shutter oscillating arm being pivotally mounted at 71 upon the frame plate 20 and being provided with a short projecting stud or pin 72, which is engaged by the free end of the spring 73, which in turn is attached at 74 to the frame plate 20, the action of the spring being such as to tend normally to move the shutter plate and supporting end of the shutter oscillating arm in a downward direction. It will be noted that there is a space between the film gate and the frame plate 20 sufficient to permit the up and down oscillation of the shutter oscillating arm 70, which passes through this space. The shutter oscillating arm is caused to move upwardly and downwardly by a cam 75 preferably formed integrally with a thin gear 76, the gear and cam element 75, 76 being rotatably mounted upon a stud 77 rigidly supported by the frame plate 20. The gear 76 meshes with the driving gear 36, whereby the cam 75 is rotated to oscillate the shutter oscillating arm 70, the lower edge of which is preferably turned at right angles, as indicated at 78, in order to provide a wide bearing surface where the shutter oscillating arm rides upon the surface of the shutter oscillating cam 75. A thin cover plate 79 is fastened by the screws 80, 80 to the frame plate 20, but spaced therefrom by hollow pillars 90, 90 in such position as to prevent the oscillating cam and gear element 75, 76 from slipping off the stud 77 upon which it is rotatably mounted. One half of a metallic cover plate 91 is attached to the base portion 21 of the camera box and the other half of this cover plate 92 is attached to the cover portion 22 of the camera box so that when the cover portion of the box is in place there will be a light-tight collar surrounding the lens tube.

A metallic foot plate 93 is attached to the bottom of the base section 21 of the camera box, this foot plate having a screw-threaded hole into which the tripod screw will take when the camera is mounted alone or in connection with the projecting attachment upon a tripod 94.

Figures 1, 5:
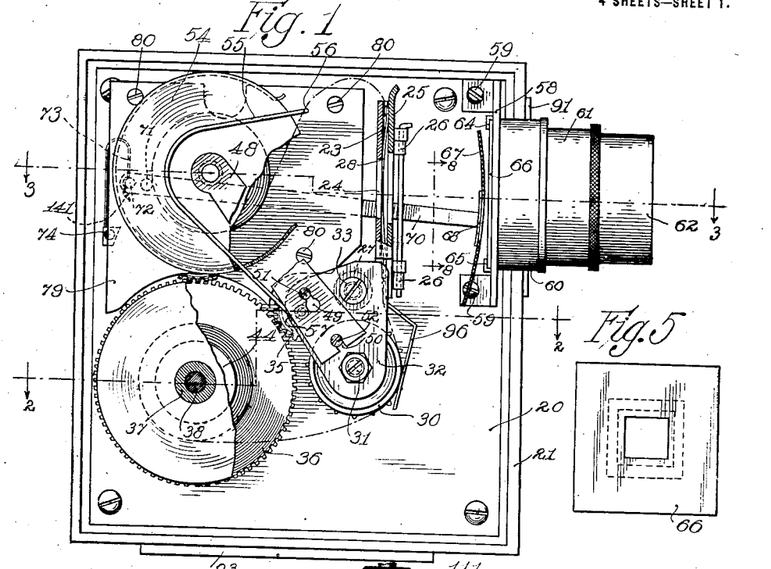
- Figure 1 is a side elevation of the camera of my invention, from which view the cover has been removed.
Fig. 5 is a view in elevation of one of the stops used in picture taking.

The operation of the camera in taking pictures may now be described. The unexposed film is first threaded in the manner indicated by the broken line in the drawings, the film leading from the unexposed film spool, over the free end of the take-up spring 55, thence through the film gate, of which the door 25 may be opened while threading the film, thence over the sprocket wheels 30, 30, and thence to the film take-up spool 44, which is provided with a suitable clip 95 to engage the free end of the film. The downwardly extending ends 96 and 97 of the springs 28 serve to hold the film firmly against the peripheries of the sprocket wheels 30, 30. The film having been threaded as described and the door of the film gate having been closed and latched, as indicated in Fig. 1, and in the full lines in Fig. 3, the cover 22 of the camera box may be placed in position and engaged by the latches, one of which is shown at 98. The crank 40 is then attached to the screw-threaded end of the drive sleeve 37. The subsequent rotation of the crank will cause the film to be intermittently advanced through the film gate by the sprocket wheels 30, 30, driven as they are by the Geneva gear previously described. The exposed film will be taken up by the exposed film spool 44, which, as previously explained, is frictionally driven by the drive sleeve 37. The unexposed film is drawn over the unexposed film spool, the spring 55 acting to maintain a suitable loop of film above the film gate, and the slack in which is relied upon to permit the sudden forward movements of the unexposed film through the film gate.

The shutter oscillating arm will be caused to swing up and down under the action of the rotating cam 75, to permit the light rays passing through the lens to strike the section of the film within the aperture of the door of the film gate to photograph the requisite image upon the film. The various gear ratios and the timing of the several gears are arranged so that the film will be advanced during the intervals between successive exposures, as determined by the movement of the shutter plate, which, being located close to the lens, cuts off the light at a narrow part of the cone of rays, thereby affording a sudden illumination of the film and an equally sudden cutting off of the light at the end of the period of exposure.

Figures 9, 10, 11:
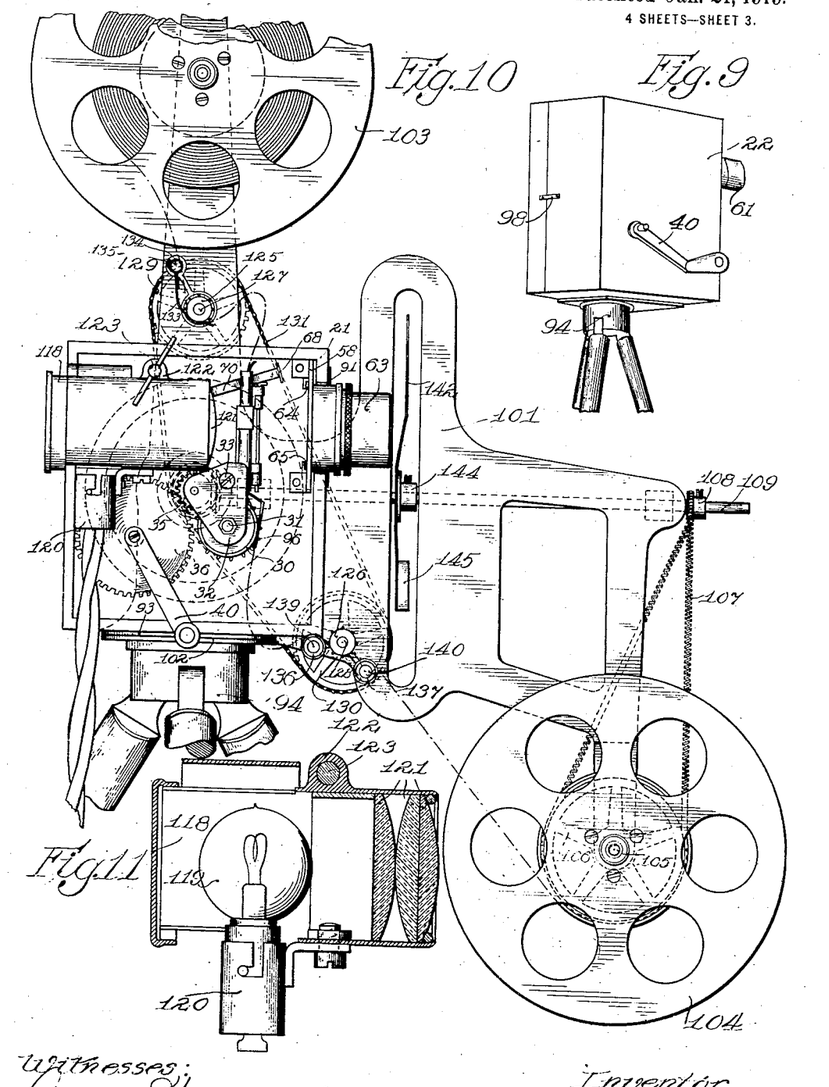
Fig. 9 is a perspective view of the camera with the cover in place.
Fig. 10 is a side elevation of the camera, with the projecting attachments combined with the camera proper.
Fig. 11 is a longitudinal cross sectional view of the illuminating element used in projecting.
Figure 12:
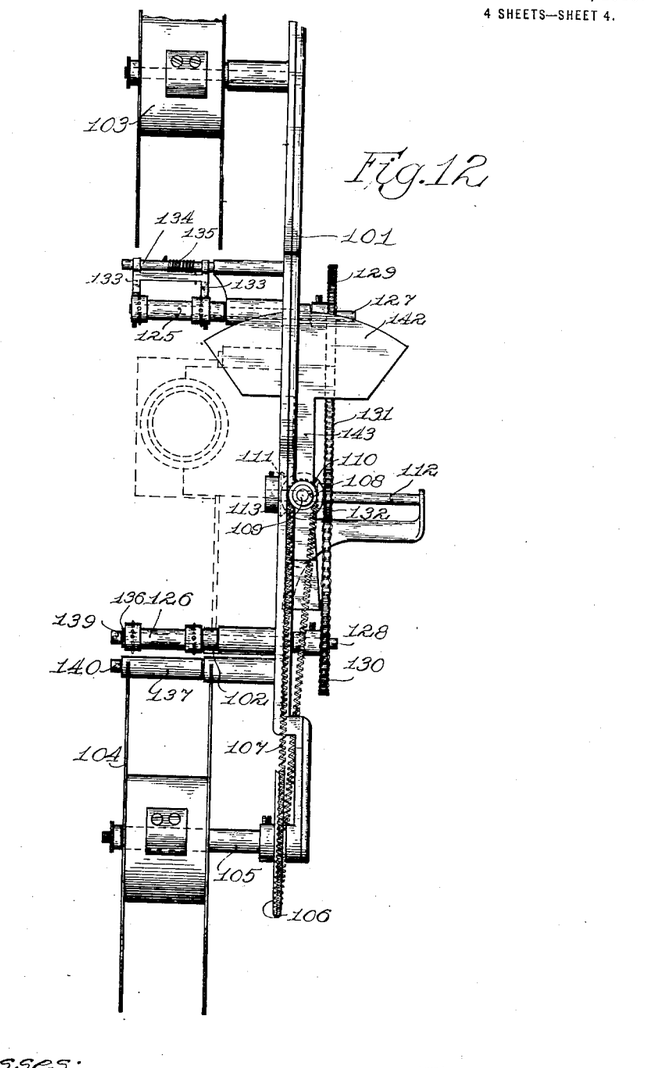
Fig. 12 is a view in front elevation of the main projecting attachment, the location of the camera being indicated in dotted lines.

We come now to a consideration of the details of the projecting attachment, particularly shown in Figs. 10, 11 and 12.

With the exception of the lamp or illuminating element, the projecting mechanism is mounted as a unit in a projector frame 101, this projector frame including a foot plate 102, which is adapted to rest upon the head of the tripod, and upon which the foot plate of the camera may be placed so that the camera proper and the projecting attachment may both be securely fastened to the tripod by a shouldered screw, which passes through the head of the tripod and through a hole (not shown) in the foot of the projecting attachment, and thence into the screw-threaded hole in the foot plate of the camera. When this tripod screw is tightened the camera portion and the projector portion of the combined mechanism will be clamped rigidly together in the relative positions best shown in Fig. 10.

In the use of the projecting attachment I employ the camera proper or parts of it intermittently to advance the film through the film gate, through which now light is projected from a suitable illuminant, an appropriate projecting lens being substituted for the taking lens. The function of the projecting attachment becomes mainly that, therefore, of supporting upon suitable reels the film which is to be projected and the film which has been projected, and also to cut off the light during the intervals or periods during which the film is being advanced through the film gate.

The film to be projected is mounted upon the film reel 103, which is rotatably carried by the projector frame 101, as indicated in Figs. 10 and 12. The film, after having been projected upon the screen, is taken up by the take-up reel 104, which is frictionally driven by the take-up spindle 105. The driving of this spindle is accomplished by a take-up drive sheave 106, over which runs a spring belt 107, the belt in turn passing over a small grooved sheave 108, near the forward end of a longitudinal spindle 109, which is supported in suitable bearings mounted upon or formed integrally with the projector frame 101, and which is provided at the rearward end with a bevel gear 110 meshing with a second bevel gear 111, which is mounted upon the projector or drive shaft 112 supported in suitable bearings mounted upon or formed integrally with the projector frame 101. The bevel gear 111 is preferably formed integrally with a driving boss 113 best shown in Fig. 2, where it will be seen that this boss is provided with dowel holes 114 and 115 adapted to register with dowel pins 116 and 117 fixedly set in the boss or hub of the balance wheel 43. The dowels and dowel holes are preferably of different sizes, as indicated, so that there may be but one angular position in which the boss of the bevel gear 111 may be engaged with the boss of the balance wheel 43, thus insuring the proper synchronism of the projector mechanism with respect to the mechanism of the camera proper.

When the mechanism of my invention is used in projecting pictures, the cover of the camera box is removed, as also the film spools from the camera. So also the projecting lens 63 is substituted for the taking lens 62. The illuminant which comprises a lamp housing 118, in which is mounted a small incandescent lamp 119, mounted in a suitable socket 120 and a suitable set of condenser lenses 121, is attached to the frame plate 20 by means of the lug 122 of the housing, through which passes a screw 123, which takes into a suitable screw threaded hole 124 in the frame plate 20.

It will now be understood that as the crank 40 is rotated in projecting pictures, motion will be transmitted through the dowel pins 116 and 117 to the bevel gear 111, and thence in turn through the bevel gear 110 and the longitudinal spindle 109, the sheave 108, the spring belt 107, and the sheave 106 to the take-up spindle 105, upon which is mounted the take-up reel 104.

In order to maintain the proper loops of slack film above and below the film gate and intermittent springs 30, 30, the projecting attachment is provided with film sprockets 125 and 126 mounted respectively on shafts 127 and 128, these shafts being provided respectively with sprocket drive gears 129 and 130, over which runs a chain belt 131, this chain belt being driven by a chain belt drive gear 132, which is mounted upon the shaft 112. The uniform motion transmitted by this mechanism to the film sprockets 125 and 126 serves to feed the film uniformly and at the proper rate to and from the film gate of the camera.

A pair of spring fingers 133, 133 is pivotally mounted upon the stud 134 and pressed by the helical spring 135 against the smooth outer edges of the film sprocket 125 to assist in maintaining the sprocket holes in the edges of the film in engagement with the teeth of the film sprocket 125. A pair of idler rolls 136 and 137 loosely mounted for rotation respectively upon the studs 139 and 140, which studs are rigidly mounted in turn in the projector frame, serves to bend the film rather sharply around the film sprocket 126 in order to maintain the sprocket holes of the film in engagement with the sprocket teeth of the film sprocket 126.

It will be understood that in threading the film to be projected from the supply reel 103 to the take-up reel 104, sufficient slack is left above the film gate and below the sprockets 30, 30 in order to accommodate the intermittency of the film through the film gate, notwithstanding the uniformity of the motion with which the film to be projected is withdrawn from the supply reel 103 and wound upon the take-up reel 104.

When the mechanism of my invention is used in projecting pictures, the taking shutter of the camera is thrown out of commission and a projecting shutter is brought into play. The oscillating arm 70 of the taking shutter mechanism is thrown out of engagement with its oscillating cam simply by raising the oscillating arm 70 to a point at which the notch 141 of the spring 73 engages the pin 72 at the rearward end of the shutter oscillating arm. This notch in the spring then serves to hold the shutter oscillating arm 70 in an elevated position, as best shown in Fig. 10. When the shutter oscillating arm is thus elevated the shutter plate 67 is withdrawn from the spring clip 68 at the forward end of the shutter oscillating arm, in order that the shutter plate may not interfere with the passage of light rays from the film to the projecting lens.

The shutter used in projecting takes the form of a segment 142 of a disk, this segment being mounted by a suitable arm 143 and a suitable boss 144, upon the longitudinal shaft 109, a counter-weight 145 serving to maintain the balance of the shutter segment. It will be understood that the rotation of the shaft 109 will cause the shutter segment 142 to pass intermittently in front of the projecting lens 63 in such manner as to cut off the passage of light rays during the intervals during which the projected film is being advanced through the film gate.

The light rays emanating from the filament of the lamp 119 are condensed by the condenser lenses and thrown through the aperture in the chute of the film gate, upon the section of film within the gate, and thence through the aperture in the door of the film gate into the projecting lens, and thence upon the screen upon which the picture is projected.

The size of the film gate, sprockets, reels, etc., is such that the camera and projector of my invention will accommodate film of the standard width and sprocket hole punching now commonly used in commercial motion picture photography Since it has been my object in my present invention to devise a motion picture camera and projector primarily for private as distinguished from public use, I have sought in so far as possible to conserve and minimize the consumption of film, which is the largest element of expense to be considered in motion picture taking and projecting. In commercial motion photography it is the custom to take and project pictures at a rate of from sixteen to twenty exposures per second. This means that a length of film sufficient to accommodate from sixteen to twenty pictures must be passed through the film gate during each second of operation. I have found that by the use of my invention satisfactory pictures can be taken and projected at the very much smaller rate of from six to eight pictures per second. If the usual motion picture camera, with the usual shutter mechanism were to be operated at a rate of only six or eight exposures per second, there would be a considerable blurring of the photographic images, due to the movement of the objects to be photographed during the considerable period of time during which the shutter would expose the film. It will be noted that my invention provides a taking shutter which cuts the cone of light rays at a narrow point and that the motion of the shutter may, by suitable design of the shutter operating cam, be made very rapid, with the result that, although but comparatively few exposures are made per second, still each exposure will be of very short duration, thereby avoiding any disadvantageous tendency to blur the photographic images, due to movement of the objects during exposure.

Since in accordance with my invention the pictures are projected upon the screen only at substantially the same low rate of six or eight per second, there would be an extremely disagreeable flicker of the picture upon the screen if the ordinary projecting shutter mechanism were employed, this being for the reason that the ordinary shutter cuts off the light for a large fraction of the total time intervening between the projection of successive pictures. In accordance with my invention the projecting shutter is arranged to cut off the light during but a small fraction of the total time intervening between the projection of successive pictures, with the result that the screen is illuminated by a projecting picture during a far larger proportion of the total time than is ordinarily the case. Each picture is therefore projected upon the screen for a much longer interval of time than is usual, while the interval of darkness between successive pictures is not necessarily greater than usual. The result is that although there will be a greater movement of objects to be photographed between the taking of successive pictures, still the illumination of the screen upon which the pictures are projected is cut off for such short intervals of time that there is no considerable flicker or consequent eye strain.

In the above I have endeavored not only to indicate that the picture taking elements of my invention must be especially planned for taking successive pictures at a low rate, but also to indicate that the mechanism which is used in projecting the pictures thus taken has been specially designed to project these slow rate pictures without introducing the element of flicker in that highly objectionable degree which would occur in attempting to use the usual motion picture projectors.

It will be apparent from the above description that the taking camera of my invention is small, compact and simple in construction and operation, that the projecting mechanism is correspondingly simple in construction and operation, and that a large number of the parts of the taking camera serve not only two or more functions in the operation of the camera as such, but also that they function in connection with the projecting attachments, whereby the ordinary duplication of parts with correspondingly increased expense and complication are avoided.

What I claim as my invention and desire to secure by Letters Patent of the United States is:

1. In a device of the class described the combination of a motion picture taking camera comprising lens, shutter, film gate, film spools, film advancing sprocket mechanism, and means for driving the shutter and the film advancing sprocket mechanism, a projecting attachment comprising film reels, film advancing sprockets, a projecting shutter, and means for driving said sprockets, projecting shutter and one of said reels, and means for conveying motion from the mechanism of said camera to the mechanism of said projecting apparatus at a single point.

2. In a device of the class described, the combination of a motion picture taking camera comprising lens, shutter, film gate, film spools, film advancing sprocket mechanism, and means for driving the shutter and film advancing sprocket mechanism, a projecting attachment therefor comprising a frame adapted to be clamped in fixed position relative to said camera, clutch mechanism for transmitting motion from the camera mechanism to the mechanism of the projecting attachment, film reels mounted upon the frame of the projecting attachment, film advancing sprockets mounted upon the frame of the projecting attachment, a rotatable projecting shutter mounted in the frame of the projecting attachment, and means for transmitting motion derived from the camera mechanism to the said shutter and sprocket mechanism of the said projecting attachment.

3. In a motion picture camera the combination of a frame plate, a stud projecting from the frame plate, a film gate carried by said stud, a bearing plate carried by said stud, film advancing sprocket wheels rotatably mounted between the frame plate and said bearing plate, Geneva gearing for driving said sprocket wheels, drive gearing for driving said Geneva gearing, an unexposed film spool adapted to deliver film to and through said film gate, a film take-up spool, and means for frictionally driving the same from said driving gear train, an oscillating shutter, a cam for driving the shutter mechanism, and gearing connecting said cam with said driving gear train.

4. In a motion picture camera the combination of a frame plate, a film gate carried thereby, sprocket wheels for drawing film through the film gate, Geneva gearing for transmitting an intermittent step by step motion to said sprocket wheels, a drive pinion for driving said Geneva gearing, a driving gear meshing with said drive pinion, a drive sleeve rigidly connected with said driving gear, and a take-up film spool frictionally mounted upon said driving sleeve.

5. In a motion picture camera the combination of a frame plate, a film gate carried thereby, sprocket wheels for drawing film through the film gate, Geneva gearing for transmitting an intermittent step by step motion to said sprocket wheels, a drive pinion for driving said Geneva gearing, a driving gear meshing with said drive pinion, a drive sleeve rigidly connected with said driving gear, a take-up film spool frictionally mounted upon said driving sleeve, an unexposed film spool, and means for detachably mounting the film spool upon a fixed part of the mechanism heretofore enumerated.

6. In a motion picture camera the combination of a frame plate, a film gate carried thereby, sprocket wheels for drawing film through the film gate, Geneva gearing for transmitting an intermittent step by step motion to said sprocket wheels, a drive pinion for driving said Geneva gearing, a driving gear meshing with said drive pinion, a drive sleeve rigidly connected with said driving gear, a take-up film spool frictionally mounted upon said driving sleeve, a shutter oscillating arm pivotally mounted upon the frame plate, a shutter plate carried thereby, a shutter oscillating cam upon which rides the shutter oscillating arm, and gearing connecting said cam with said driving gear.

7. In a motion picture camera the combination of a frame plate, a film gate carried thereby, sprocket wheels for drawing film through the film gate, Geneva gearing for transmitting an intermittent step by step motion to said sprocket wheels, a drive pinion for driving said Geneva gearing, a driving gear meshing with said drive pinion, a drive sleeve rigidly connected with said driving gear, a take-up film spool frictionally mounted upon said driving sleeve, an unexposed film spool, means for detachably mounting the film spool upon a fixed part of the mechanism heretofore enumerated. a shutter oscillating arm pivotally mounted upon the frame plate, a shutter plate carried thereby, a shutter oscillating cam upon which rides the shutter oscillating arm, and gearing connecting said cam with said driving gear.

8. In a device of the class described the combination of a motion picture taking camera comprising lens, shutter, film gate, and film advancing mechanism, and a projecting attachment therefor comprising a frame, film reels rotatably mounted upon said frame, a clutch for transmitting motion from said camera mechanism to the mechanism of said projecting attachment, a longitudinal shaft having geared connection with said motion transmitting means, a rotary shutter mounted upon said longitudinal shaft, and means for transmitting motion from said longitudinal shaft to one of said film reels.

9. In a device of the class described the combination of a motion picture taking camera comprising lens, shutter, film gate, and film advancing mechanism, and a projecting attachment therefor comprising a frame, film reels rotatably mounted upon said frame, a clutch for transmitting motion from said camera mechanism to the mechanism of said projecting attachment, a longitudinal shaft having geared connection with said motion transmitting means, a rotary shutter mounted upon said longitudinal shaft, means for transmitting motion from said longitudinal shaft to one of said film reels, sprocket wheels for advancing film from one of said reels and toward the other of said reels, and means for transmitting motion from said motion transmitting means to said sprocket wheels.

10. In a device of the class described the combination of a camera frame plate, a film gate carried thereby, sprocket wheels adapted intermittently to pass film through the film gate, Geneva gearing for transmitting intermittent motion to said sprocket wheels, a driving pinion for driving the male member of said Geneva gearing, a driving gear meshing with said driving pinion, a driving sleeve rigidly attached to said driving gear, a stud mounted upon the frame plate upon which are rotatably mounted said driving gear and the associated driving sleeve, a crank adapted for connection with the driving sleeve, a take-up film spool frictionally mounted upon said driving sleeve, an unexposed film spool detachably mounted upon a fixed part of the mechanism hereinabove enumerated, a shutter oscillating arm pivotally mounted upon said frame plate, a shutter plate carried by said arm, a shutter oscillating cam pivotally mounted upon said frame plate, gearing connecting said cam with said driving gear, spring means for pressing the shutter oscillating arm into contact with said cam, means adapted to hold the shutter oscillating arm out of contact with said cam when the aforesaid mechanism is used in projecting pictures, interchangeable projecting and taking lenses adapted to be carried in fixed position by said frame plate, a projector frame adapted to be clamped in fixed position relative to the camera mechanism above enumerated, rotatable film reels carried by said projector frame, a longitudinal shaft carried by said projector frame, a rotatable shutter mounted upon said longitudinal shaft, film advancing sprocket wheels rotatably mounted in the projector frame, a projector drive shaft having clutch connection with an operating part of the camera mechanism, a sprocket chain drive wheel mounted upon said projector drive shaft, sprocket gearing and chain transmitting motion from said projector drive shaft to the projector sprocket wheels, bevel gears connecting said longitudinal shaft with said projector drive shaft, grooved sheaves and spring belt for transmitting motion from said longitudinal shaft to one of said projector film reels, and an illuminating element adapted for detachably mounting upon the camera frame plate substantially as described.

11. In a structure of the class described the combination with a motion picture camera structure comprising a box having a lens tube support, an apertured film support at the rear of said lens support, and means for intermittently advancing a film over said support comprising a rotatable member and means for rotating said member, of a supporting frame, means for attaching said frame to said box, supply and take-up reels journaled in said frame, means for maintaining film loops above said apertured film support and below said film advancing means comprising film sprockets, a projecting lens removably secured to said lens tube support, an inclosed illuminant removably supported at the rear of said film support; means for driving said take-up reel and film sprockets comprising a drive shaft having detachable driving connections with said rotatable member, driving connections between said drive shaft and said film sprockets, a second shaft, and driving connections between said second shaft and said drive shaft and between said second shaft and said take-up reel; and a sector shaped shutter mounted in co-acting relation with said lens and driven by said second shaft.

12. In a structure of the class described the combination with a motion picture camera structure comprising a box having a lens tube support, an apertured film support at the rear of said lens support, and means for intermittently advancing a film over said support comprising a rotatable member and means for rotating said member, of a supporting frame, means for attaching said frame to said box, supply and take-up reels journaled in said frame, means for maintaining film loops above said apertured film support and below said film advancing means comprising film sprockets, a projecting lens removably secured to said lens tube support, an illuminant removably supported at the rear of said film support; means for driving said take-up reel and film sprockets comprising a drive shaft having detachable driving connections with said rotatable member, driving connections between said drive shaft and said film sprockets, and between said drive shaft and said take-up reel; and a sector shaped shutter mounted in co-acting relation with said lens and driven by said shaft.

13. In a structure of the class described the combination with a motion picture camera structure comprising a box having a lens tube support, an apertured film support at the rear of said lens support, and means for intermittently advancing a film over said support comprising a rotatable member and means for rotating said member, of a supporting frame, means for attaching said frame to said box, supply and take-up reels journaled in said frame, means for maintaining film loops above said apertured film support and below said film advancing means comprising film sprockets, a projecting lens removably secured to said lens tube support, an illuminant removably supported at the rear of said film support, means for driving said take-up reel and film sprockets comprising a drive shaft having detachable driving connections with said rotatable member, and a shutter mounted in co-acting relation with said lens and driven by said drive shaft.

14. In a structure of the class described the combination with a motion picture camera structure comprising a box having a lens tube support, an apertured film support at the rear of said lens support, and means for intermittently advancing a film over said support, of a supporting frame, means for attaching said frame to said box, supply and take-up reels journaled in said frame, means for maintaining film loops above said apertured film support and below said film advancing means comprising film sprockets, a projecting lens removably secured to said lens tube support, an illuminant removably supported at the rear of said film support, means for driving said take-up reel and film sprockets comprising a drive shaft, and a shutter mounted in co-acting relation with said lens and driven by said drive shaft.

15. In a structure of the class described the combination with a motion picture camera comprising a box having a lens tube support, an apertured film support at the rear of said lens support, and means for intermittently advancing a film over said support, of a supporting frame detachably secured to said camera, supply and take-up reels journaled in said frame, means for maintaining film loops above said apertured film support and below said film advancing means, a projecting lens removably secured to said lens tube support, an illuminant removably supported at the rear of said film support, means for driving said take-up reel, comprising a drive shaft, and a shutter mounted in co-acting relation with said lens and driven by said drive shaft.

16. In a structure of the class described the combination with a motion picture camera comprising a box having a lens tube support, an apertured film support at the rear of said lens support, and means for intermittently advancing a film over said support, of a supporting frame detachably secured to said camera, supply and take-up reels journaled in said frame, means for maintaining film loops above said apertured film support and below said film advancing means, a projecting lens removably secured to said lens tube support, an illuminant removably supported at the rear of said film support, means for driving said take-up reel, and a shutter mounted in co-acting relation with said lens.

17. In a structure of the class described the combination with a motion picture camera comprising a box having a lens tube support, an apertured film support at the rear of said lens support, means for intermittently advancing a film over said support, of a supporting frame detachably secured to said camera, supply and take-up reels journaled in said frame, a projecting lens removably secured to said lens tube support, an illuminant removably supported at the rear of said film support, means for driving said take-up reel, and a shutter mounted in co-acting relation with said lens.

18. In a moving picture camera the combination with a film gate, and means for intermittently advancing the film thereacross, of a supply reel and means for maintaining a substantially uniform rotation of said supply reel as the film is intermittently drawn across said film gate, comprising a spring having a film supporting portion between said supply reel and said film gate, the spring being placed under tension by each advance of the film.

19. A machine of the class described comprising in combination a framework, an operating shaft journaled thereon, a gear fixed to said operating shaft, a film advancing sprocket, a pinion meshing with said gear advancing therefrom in ratio of four to one, Geneva gear mechanism between the pinion and the sprocket, said Geneva gear mechanism being arranged to advance the sprocket by a step by step movement through one revolution for each revolution of the aforesaid gear, a fly-wheel fixed with respect to said pinion, and shutter mechanism driven from said gear, said shutter mechanism comprising a second gear meshing with the first and driven therefrom in the ratio of two to one, a cam fixed with respect to said second gear, a pivoted lever acting as a follower for said cam and a shutter carried by said lever.

20. A machine of the class described comprising in combination a film advancing sprocket, Geneva gear mechanism for advancing said sprocket, a pinion for driving said Geneva gear mechanism, shutter operating mechanism comprising a cam, a gear fixed with respect to said cam, a main driving gear meshing directly with said first gear and said pinion, and means for rotating said main driving gear.

21. A machine of the class described comprising in combination a film advancing sprocket, Geneva gear mechanism for advancing said sprocket, said Geneva gear mechanism consisting of two coöperating elements, one of which is fixed on the same shaft with said sprocket, a shaft on which is mounted the other element of said Geneva gear mechanism, a pinion on said last mentioned shaft, shutter operating mechanism comprising a cam, a gear rigidly fixed thereon, a main driving gear directly meshing with said first mentioned gear and said pinion, and means for operating said main driving gear.

22. A shutter and film operating mechanism, each element of which is mounted for revolution around one of four parallel axes, said mechanism comprising a sprocket, one of a pair of coöperating Geneva gears fixed with respect to said sprocket, a second Geneva gear coöperating with the first, a pinion fixed with respect to said second Geneva gear, a cam, a gear fixed with respect to said cam, and a common actuating gear for said last mentioned gear and said pinion and directly meshing with the same.

23. A machine of the class described comprising a casing, a supporting plate in said casing, a shutter and film operating mechanism supported by said plate, said mechanism comprising a driving gear mounted on the front side of said plate, a pinion driven by and meshing with said gear, a shaft whereon said pinion is fixed, extending through said plate to the rear side thereof, Geneva gearing disposed on the rear side of said plate, one of the elements of said Geneva gearing being attached to said shaft, a second shaft extending through said plate and attached to the other element of said Geneva gearing, a sprocket wheel fixed on said second shaft and disposed on the front side of the supporting plate, a second gear mounted on the front side of the supporting plate, and meshing directly with the driving gear, a cam fixed with respect to said second gear and a shutter arm disposed on the front side of the plate, said shutter arm arranged to be operated by said cam, and a shutter carried by said arm.

24. A device of the class described comprising in combination a supporting plate, a stud carried thereby, a film guide disposed on the front face of said plate and having its lower end attached to said stud so as to be supported thereby, there being a space intervening between the film guide and supporting plate, a cam mounted on the front face of said plate, means for operating said cam, a shutter arm serving as a follower for said cam having one of its ends pivoted to said plate on one side of the film guide, said arm having its free end passing through the space between said plate and film guide, and a shutter attached to the free end of said arm.

25. Apparatus of the class described comprising in combination with a casing, a film guide carried thereby, an aperture in said film guide, a lens in alinement with said aperture, a shutter arm having one end pivoted on the casing at a point behind said film guide, a shutter disposed between the lens and film guide and mounted on the free end of said shutter arm, and means for oscillating said arm on its pivot whereby to reciprocate said shutter between the lens and film guide.

In witness whereof, I hereunto subscribe my name this 4th day of October, 1917.

VARIAN M. HARRIS.

Witnesses:
    MARY A. COOK,
    ANDREW WINTERCORN.